F. LOWENSTEIN.
COMBINED KEY AND SWITCH.
APPLICATION FILED NOV. 29, 1918.
1,419,460. Patented June 13, 1922.
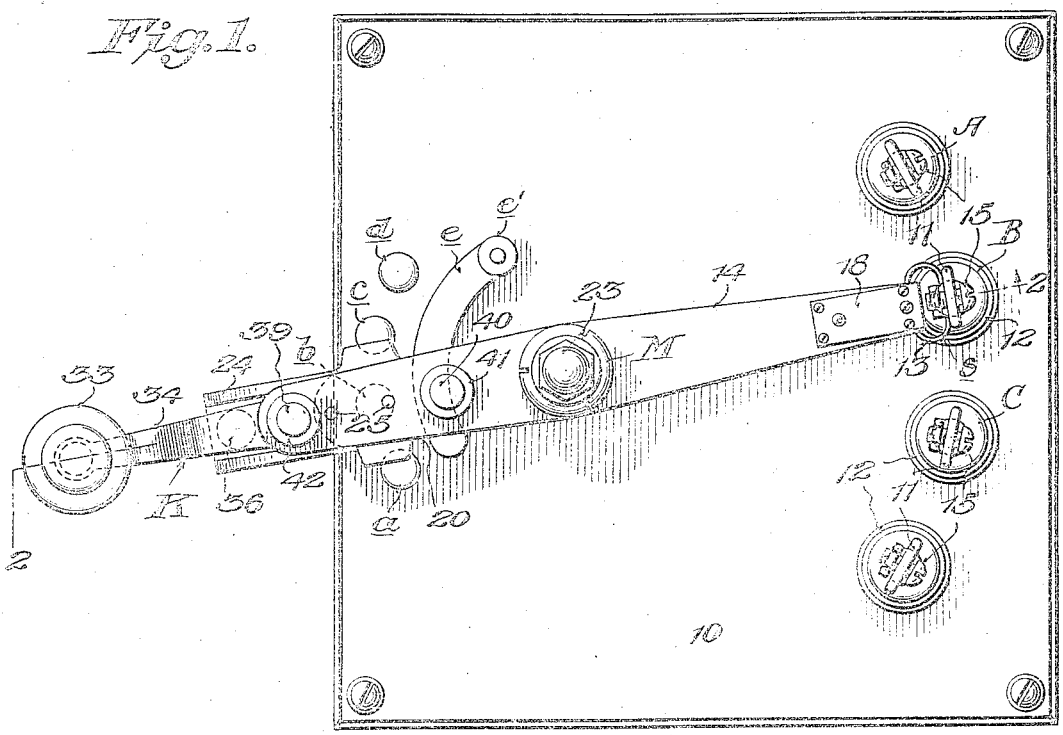
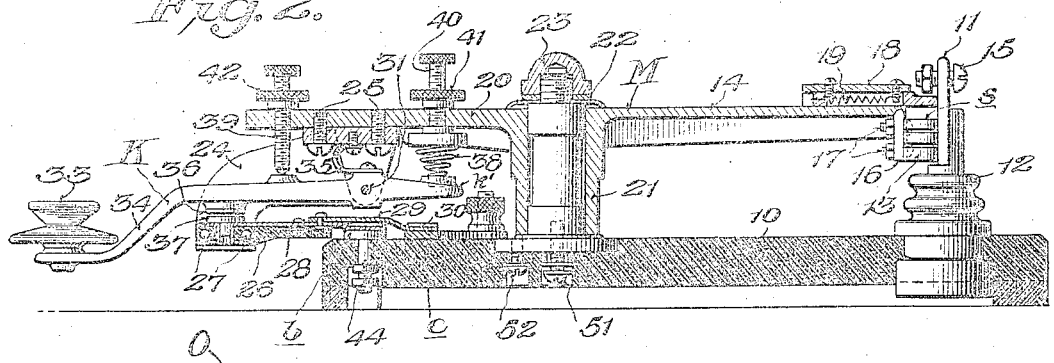
Inventor
F. Lowenstein,
By M. C. Massie
his Attorney

UNITED STATES PATENT OFFICE.

FRITZ LOWENSTEIN, OF BROOKLYN, NEW YORK.

COMBINED KEY AND SWITCH.

1,419,460. Specification of Letters Patent. Patented June 13, 1922.

Application filed November 29, 1918. Serial No. 264,643.

*To all whom it may concern:*

Be it known that I, FRITZ LOWENSTEIN, a citizen of the United States, residing at Brooklyn, in the county of Kings and State of New York, have invented certain new and useful Improvements in Combined Keys and Switches; and I do hereby declare the following to be a full, clear, and exact description of the invention, such as will enable others skilled in the art to which it appertains to make and use the same.

My invention relates to a combined key and switch and more particularly to an instrument comprising a key and a wave changer for use in transmitting messages in wireless telegraphy or other form of radio communication.

In transmitting at different frequencies and wave lengths it is necessary to make adjustments of parts of the transmitter circuits in changing from one wave length to another. It is desirable to make such adjustments with a minimum number of instruments and with as little manipulation as possible.

Accordingly it is an important object of my invention to provide a compact transmitting instrument that shall have combined therein a transmitter key, and suitable means for selecting the necessary connection for any one of a number of wave lengths.

Another object of my invention is to so arrange the key lever of the instrument that it shall be located in an especially convenient position for the operator so that he may operate as rapidly and with as little effort as possible.

Another object of my invention is to arrange the transmitter key so that it shall also serve as a handle for operating the switching member in selecting the connections desired when changing from one wave length to another.

Another object of the invention is to provide a simple and compact instrument in which the parts are readily accessible.

Another object of the invention is to provide a transmitting instrument of the kind described that shall have means whereby a volt meter or similar instrument may be connected in circuit in all positions of the instrument to enable the operator to know the voltage of the supply circuit in any of the sending positions.

The above and other objects and the novel features of the invention will be apparent from the following description taken in connection with the drawing, in which—

Fig. 1 is a plan view of the combined key and wave changer handle embodying my invention.

Fig. 2 is a vertical sectional view of the same taken on the line 2—2 of Fig. 1, parts being shown in side elevation, and Fig. 3 is a diagram of so much of a transmitting system as is necessary to illustrate the use of the instrument embodying the invention.

Referring to the drawing, 10 designates the insulating base of the instrument, the upper side of which carries two concentrically arranged series of contacts A, B, C and D and $a$, $b$, $c$ and $d$ and a conductive segment or plate $e$ concentric with these contacts. The number of contacts in each set may, of course, be varied to correspond to the number of different wave lengths employed. The contacts A, B, C and D are similar to one another, each embodying a post 11 mounted upon an insulating support 12 secured to the base 10. Part of the inner vertical face of each post is provided with a contacting surface engageable by a contact member 13 at the outer end of the arm 14 of a controller member M of brass or other suitable conducting material. Each contact post 11 is also provided with a binding screw 15 for securing a conductor thereto. The contact member 14 may consist of a suitable resilient member adapted to yieldingly engage the face of the contact post 11 to make good electrical connection therewith. In the present arrangement, contact member 13 is substantially a resilient brush device and comprises a plurality of bow springs $s$ having their ends secured by screws 17 to the depending end 16 of the arm 14. The springs $s$ are curved so as to be readily movable in either direction into contact with the posts 11. When the springs engage the posts they are compressed slightly so that they will make good electrical contact with the posts. The controller member M is held in any one of its adjusted positions by a plunger or detent member 18 that is carried by the outer end of the arm 14 and is yieldingly forced outwardly into latching engagement with the post 11 by a spring 19 having its opposite ends secured to the plunger 18 and to the arm 14, respectively.

The controlling member M has another, and in this instance, shorter, arm 20, that is in radial alignment with the arm 14, and that also has a hollow integral boss 21 on its under side; serving to support the controlling member and to space the arms 14 and 20 from the upper side of the base 10. The boss 21 also receives the pivot pin 22 about which the controlling member is swingable, said pivot pin also desirably serving as a common point of connection to ground, as will more fully appear. Appropriate means, such as a suitable nut 23 on the upper end of the pin 22, holds the controlling member in place.

A depending supporting means or stirrup 24 is secured to the arm 20 and projects downwardly therefrom and beyond the end of the arm and the edge of the base 10. The stirrup is secured to the arm 20 by screws 25 and at its free end it supports a block 26 of insulating material which is secured to the stirrup by screws 27. The insulating block 26 carries two resilient brushes 28 and 29, brush 28 being arranged to make contact with any one of the contacts $a$, $b$, $c$, and $d$, while brush 29 yieldingly engages the plate $e$, in all positions of the controlling member M, as at 30. As control member M is swung about its pivot the brush 29 engages the plate $e$, while the brush 28 is movable from one contact of the series $a$, $b$, $c$, and $d$, to the other.

The stirrup 24 is also provided with a pivotal support at 31 for the key lever K that carries an operating key knob 33 at its outer end. The major portion of the lever K is disposed in the space between the arm 20 and the base 10, the outer end of the lever K extending outwardly and downwardly as at 34 to bring the key knob 33 close to the support upon which the base 10 is mounted and away from the edge of the base 10 and the conducting parts of the instrument. The lever K may also be used as a handle for swinging the control member M horizontally about its pivot. The key is electrically connected to the arm 20, through the stirrup 24, by a conductor 35 that is secured to the key and to the stirrup. The under side of the key lever carries a contact 36 of suitable wear-resisting metal that is arranged to engage a corresponding contact 37 secured to the upper side of the brush 28. Normally a suitable means, such as a spring 38, holds the key in open position with the contacts 36 and 37 separated. The spring 38 exerts downward pressure on the arm $k'$ of the key lever and tends to depress it and hold the other arm of the lever up against the lower end of the adjusting screw 39. The spring 38 may be adjusted by a thumb screw 40 that is held in adjusted position by the check nut 41, and a similar check nut 42 maintains the screw 39 in its adjusted position.

Each of the contacts, $a$, $b$, $c$, and $d$, is provided with a suitable binding nut 44 or other means whereby it may be connected to a conductor, and, as shown in Fig. 3, this series of contacts is connected, respectively, to the sources of current 46, 47, 48, and 49, which supply current of different frequencies. The plate $e$, carries a binding screw $e'$, to which a conductor 50 may be secured that is electrically connected to a volt meter V for indicating the voltage of any one of the sources of energy that is being used for transmitting purposes. The pivot 22 of the controller arm M is provided with suitable binding screws 51 and 52 by means of which it may be connected to portions of the transmitting circuit and the contracts A, B, C, and D are electrically connected to conductors that lead to taps in a tuning inductance in the transmitting circuit. The primary winding P of a power output circuit O is connected by conductors 54 and 55 to the pivot 22 and to the alternating current sources 46, 47, 48, and 49, respectively. Both branches of the transmitting circuit and both arms of the controller M are connected to ground at G through the pivot 22. Thus the operating key is located close to ground, which is a distinct advantage.

The operation of the instrument will be apparent from the drawing and foregoing description. The operating wave length having been decided upon by the operator, the controlling member M is swung about the pivot by using the key lever K as a handle and when the member M is swung to the position giving the desired wave length the key lever K is at once in position for transmitting messages. Thus, only a single and simple adjustment is necessary to change the wave length, while the key lever remains at all times in an operative position. At the same time the voltage of the supply circuit is indicated to the operator at all times and he may thus know at any time without a special manipulation, what the voltage of his supply circuit is. The particular overhung position of the key lever K is an advantageous one, because, during the adjustment of the controlling member M and also during the operation of the key, the hand of the operator is at a distance from all movable parts of the instrument except the key, is close to the operating table or bench, and is also in a convenient position for resting the hand while transmitting messages. Furthermore, mounting the key adjacent one extremity of the switch lever or handle, gives a maximum leverage in shifting the lever, requiring but slight effort on the part of the operator.

While I have shown and described a preferred embodiment of the instrument in detail, it is to be understood that numerous changes may be made in the form of instrument shown without departing from the spirit of the invention. It will also be evident that certain features of the combined key and switch herein disclosed are not necessarily limited to an instrument for use in connection with radio communication circuits but may also be embodied in instruments used in ordinary wire communication, in systems, for example, where a number of sets of circuits are to be controlled by a single instrument.

What I claim is:

1. In a combined key and switch, the combination with two sets of contacts, of a pivotally mounted controlling member, contact-engaging elements carried by said member and respectively arranged to engage simultaneously any one of the contacts of one set and a corresponding contact of the other set upon suitable pivotal movement of said controlling member, a key lever pivotally supported by said member and extending below and beyond the same, and a contact movable by said lever to close and open a circuit through said contact-engaging elements and the contacts engageable thereby.

2. In a combined key and switch, the combination with two sets of contacts, of a swingable controlling member having conducting arms, contact-engaging elements carried by said arms and respectively arranged to engage simultaneously any one of the contacts of one set and a corresponding contact of the other set, a key lever electrically connected to one of said arms and pivotally supported below the same, and a contact carried by said lever and arranged to close a circuit through one of said contact-engaging elements and any of the said contacts engageable by it.

3. In a combined key and switch, the combination with two sets of contacts, of a swingable controlling member having arms, contact-engaging elements carried by said arms and respectively arranged to engage simultaneously any one of the contacts of one set and a corresponding contact of the other set, supporting means secured to and depending from one of said arms, a key lever pivotally carried by said supporting means, and cooperating contacts on said key lever and supporting means, said contact on the supporting means being electrically connected to one of said contact-engaging elements whereby the key is arranged to close a circuit through said last mentioned contact-engaging element.

4. In a combined key and switch, in combination, a base, a controller member pivoted thereon and comprising arms spaced from the base, and a key pivotally mounted on one of said arms and having a part disposed between said arm and the upper side of the base.

5. In a combined key and wave change handle, in combination, a base, a plurality of sets of concentrically arranged contacts on said base, a controller member pivoted concentrically of said contacts and comprising conducting arms spaced from the upper side of the base, contact members carried by said arms and arranged to respectively engage the sets of contacts on the base, one of said contact members being insulated from the arm that carries it, and a key lever electrically connected to said controller member and pivotally mounted below the last-mentioned arm, said key lever being normally electrically disconnected from said insulated contact but being operable to engage the same and to close an electrical circuit through it and the arm supporting it.

6. In a combined key and switch, the combination with two sets of contacts, of a controlling member carrying contact-engaging elements arranged to respectively engage corresponding contacts of said sets, means arranged for connection to a voltmeter, and a key carried by said controlling member and arranged to close a circuit through one of said contact-engaging elements and any of the contacts engageable by it and also a circuit through such voltmeter connection means.

7. In a combined key and switch, the combination with a base, of two sets of concentrically arranged contacts thereon, a plate on said base arranged for connection to a voltmeter, a controlling member swingable in a plane above and parallel to said base, contact-engaging elements carried by said member and arranged to engage corresponding contacts of said sets, one of said elements being arranged to engage said plate whenever it engages one of said contacts, and a key associated with such plate-engaging element and arranged to close a circuit including the same.

8. In a combined key and switch, the combination with a base, of two sets of contacts on the base, a controlling member having two conducting arms swingable in a plane parallel to the base and about a pivot on the base, means arranged to electrically connect a ground conductor to said pivot and thus to said arms, contact-engaging elements carried by said arms and arranged to engage corresponding contacts of said sets, and a key arranged to close a circuit, through one of said arms and one of said contact-engaging elements.

9. In a combined key and switch, the combination with a base, of two sets of contacts, a controller member having conducting arms carrying a boss that spaces said arms from the top of said base, contacting elements carried by said arms for engaging said sets of contacts, and a circuit-closing key lever electrically connected to one of said arms and pivoted in the space between the base and the arm to which it is connected.

10. In a key and switch, the combination with a base, of a set of contacts each comprising a post having a vertical contact face, another set of contacts corresponding respectively to such post contacts, a controller member, contact-engaging elements on said controller member for engaging pairs of said contacts, one in each set, successively, one of such elements having a contacting surface cooperating with such vertical contact faces, and a key lever carried by said controller member, and arranged to move the latter.

11. In a combined key and switch, the combination, with two sets of contacts, of a movable conductive member carrying two contact-engaging elements adapted, respectively, to engage corresponding contacts of each set as said member is moved, one of said contact-engaging elements being normally insulated from said member, and means carried by said member and operable to close a circuit through said member and such normally insulated element.

In testimony whereof I hereunto affix my signature.

FRITZ LOWENSTEIN.